UNITED STATES PATENT OFFICE.

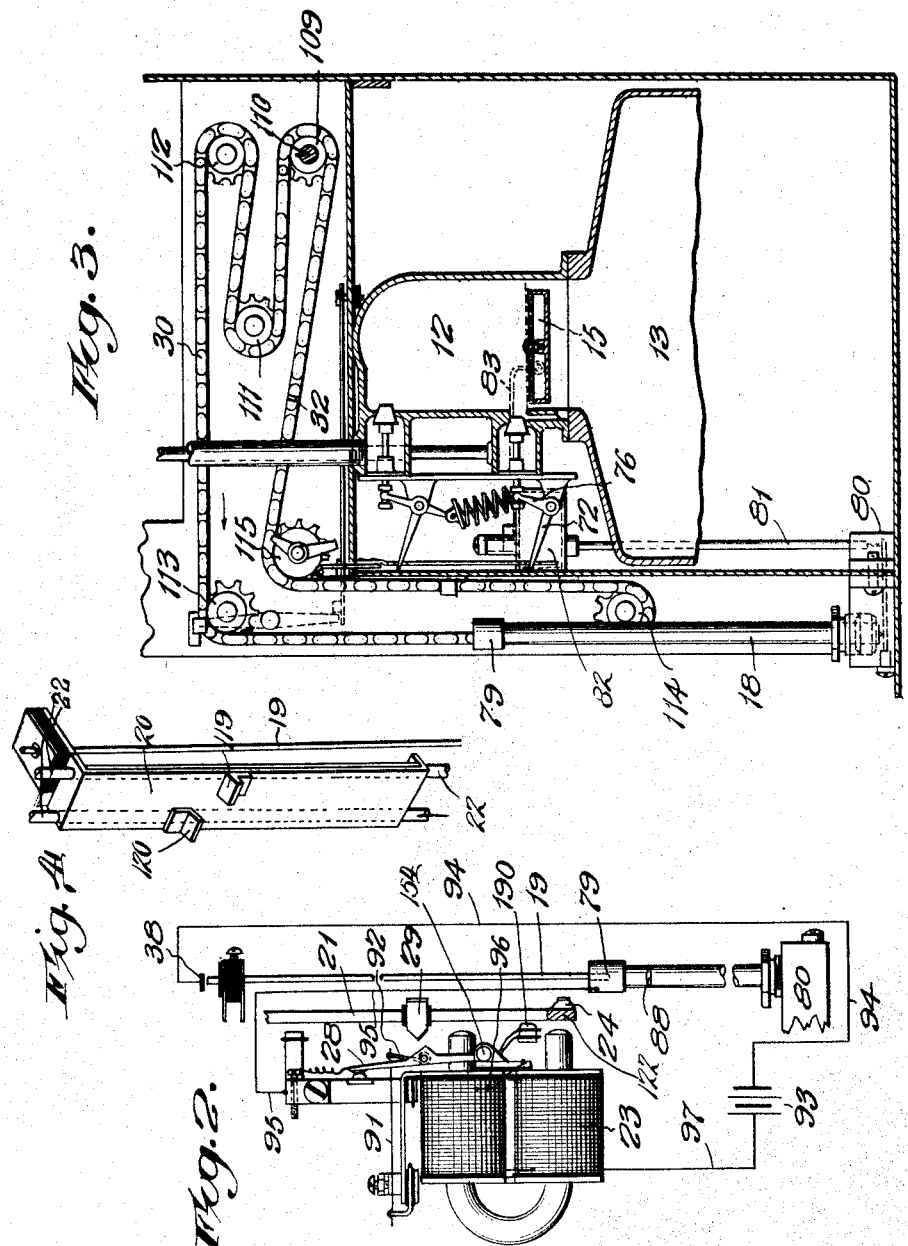

LAURENCE A. STENGER, OF DENVER, COLORADO.

PRESSURE REGISTERING AND RECORDING DEVICE.

1,386,661.      Specification of Letters Patent.      Patented Aug. 9, 1921.

Original application filed October 14, 1918, Serial No. 257,939. Divided and this application filed April 12, 1919. Serial No. 289,601.

*To all whom it may concern:*

Be it known that I, LAURENCE A. STENGER, a citizen of the United States, residing at Denver, in the county of Denver and State of Colorado, have invented certain new and useful Improvements in Pressure Registering and Recording Devices, of which the following is a specification, reference being had therein to the accompanying drawing.

My invention relates to pressure registering and recording means and more particularly to means for registering and automatically recording pressures obtaining at different times without having to load the pressure responsive means with motion transmitting devices, thus eliminating error due to friction and inertia of such devices.

In the embodiment herein disclosed, I make use of a mercury column as the pressure responsive means, and the device is in the form of means for automatically registering and recording the degree of vacuum in the absorbing chamber of a gas testing machine. However, it will be obvious, after an understanding of the present disclosure, that other forms of pressure responsive means may be used instead of a mercury column and that the invention is capable of various uses other than the specific one herein described for the purpose of disclosure.

Other objects of my invention consist in certain advantageous arrangements and combinations of parts hereinafter described and specifically pointed out in the claims.

My invention is illustrated in the accompanying drawings, in which—

Fig. 2 is a diagrammatic view showing the electro-magnetic recording means and the circuit connections therefor.

Fig. 3 is a vertical section through the gas chamber of a gas testing machine showing the connection of the pressure responsive means therewith and the arrangement of the sprocket chain for operating the recording means.

Fig. 4 is a fragmentary, perspective view showing the portion of the carriage 20 to which the lifting and depressing lugs are attached, and the method of mounting on the guide rods.

Figure 1:
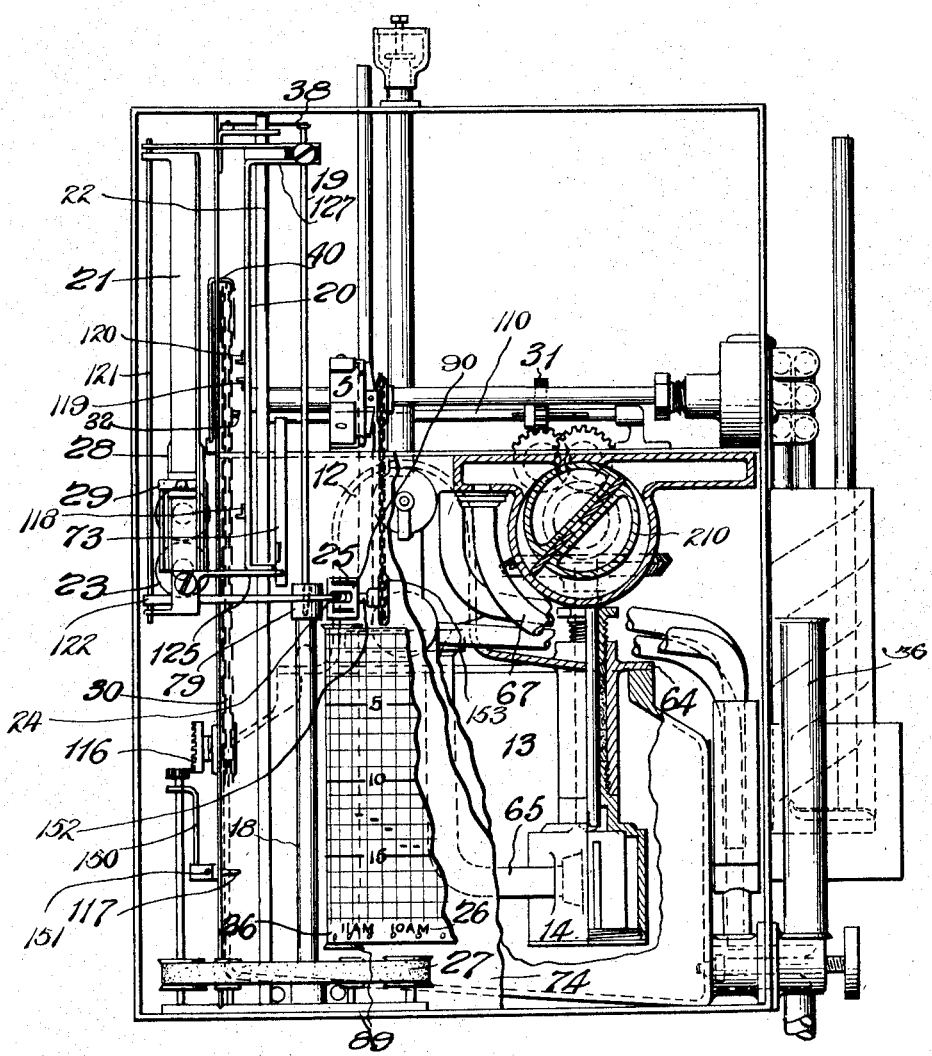
Figure 1 is a front elevation of a gas testing machine with my improved registering and recording means applied thereto.

Referring to the drawings in detail, the pressure responsive means is here shown in the form of a mercury gage of the inverted syphon type connected with the gas chamber 12 of a gas testing machine for indicating the degree of vacuum therein. This consists of the gage tube 18 preferably of glass, having a perforated cap 79 of suitable electrical conducting material such as metal, at the top, and connected at the bottom through a connecting block 80 with the tube 81 which leads to the chamber or reservoir 82 having a horizontal area much greater than that of the indicating tube 18. From the top of the chamber 82 a connecting tube 83 leads to the interior of the gas chamber 12. As the top of the tube 18 is open to atmosphere, variations of the pressure within the gas chamber 12 will result in variations in the level of the mercury in the chamber 82 and in the indicating tube 18, the variations of mercury level in the tube 18 being greater than those in the chamber 82 because of the greater area of the latter.

For recording the different indications of the mercury column 88 in the gage 18, I provide an electromagnetic recording device arranged to record the height of the mercury column on a chronometrically driven record tablet 26. The record tablet 26 consists of a sheet graduated vertically in degrees of pressure, and preferably in test values represented by different degrees of vacuum when applied to a testing machine as here shown, and horizontally in units of time, the sheet being arranged to remain vertically stationary and to be moved horizontally by being unwound from a supply roller 89 onto a storage roller 36 driven by a suitable clock train, not shown, in accordance with the chronometric graduation on the record sheet.

The recording means consists of a carriage 20 suitably mounted on a pair of guide rods 22 in frictional engagement therewith so as to remain in the position last placed. This carriage carries a contact needle 19 insulated from the carriage and arranged to move downwardly through the cap 79 in electrical contact therewith into the gage tube 18, as the carriage moves downwardly. The carriage 20 also carries an armature 21 pivoted on the rod 121 and to which is attached a recording plummet 24 arranged to pass down over the record tablet 26, normally out of engagement therewith, as the carriage moves downwardly. This armature is made substantially equal in length to the length of travel of the carriage and is acted upon by a stationary electromagnet 23 mounted so as to be in operative relation to the armature in all positions of the carriage, Fig. 2 being in the nature of a diagram to show certain mechanical and electrical relation of parts, the pivotal mounting of the armature 21 is omitted for the sake of clearness. For example the upper portion of the armature is broken away and the lower ear 122 sectioned off as extending outside of the plane of the drawing. The plummet 24 is attached to the armature in any suitable manner as by soldering and in Fig. 2 extends away from the observer. In Fig. 1 it will be observed that the plummet 24 extends to the right of the armature which, being situated between the observer and the magnet 21, is moved in a direction away from the observer when the armature is attracted by the magnet. Just above the record supply roller 89 is mounted a changeable inking device 90 so arranged that the plummet 24 will be in operative relation therewith when the carriage is in its uppermost position. The inking device 90 is made in the form of a drum as shown with a plurality of inking pads 25, the device being mounted on a rotatable shaft 152 whereby it may rotate to present different inking pads to the plummet. The shaft 152 is here shown operated by a wheel 153 which for the purpose of the present disclosure may be considered as hand operated, the purpose being to enable different color inks to be used at will. The plummet 24 is mounted on the armature in such manner that when the armature is attracted by the magnet 23, the plummet will be brought into contact with one of the pads 25 on the inking device 90 or with the record tablet 26, according to the position of the carriage. Just below the supply roller 89, a cleaning belt 27 is mounted in a manner to be engaged by the plummet when the carriage reaches its lowermost position. The contact 28 is arranged to open the circuit of the magnet 23, each time the armature 21 is attracted, by the armature striking the insulated stud 190. The movable member of the contact 28 is held against accidental movement in either opened or closed position by means of an off-center holding device consisting of the leaf spring 91 and link 92. As the contact member 28 is pivoted at 154 and the point where the spring 91 bears downwardly on the link 92 is stationary, the pivotal connection of the link 92 will be swung from one side to the other of the line connecting the center of the pivot 154 with the point of contact of spring 91 with link 92 in the oscillation of the movable contact member 28 from one side to the other, the downward tension of the spring 91 holding the contact in either position against accidental displacement in a manner which will be well understood. For energizing the magnet 23 upon arrival of the plummet 24 into operative relation with the inking device, a cam 29 is so mounted on the armature 21 as to engage a complementary projection of the movable member of the contacting device 28 just before the armature reaches its uppermost position which partially closes the energizing circuit of magnet 23, which circuit is completed upon closure of the contact 38 adjusted to close upon arrival of the plummet 24 in the exact position for engagement with the inking device. The energizing circuit thus completed may be traced from battery 93 through conductor 94, contact 38, contact needle 19, cap 79, conductor 95, contact 28, conductor 96, magnet 23, conductor 97 back to battery 93. For energizing the magnet 23 to bring the recording plummet 24 into engagement with the record tablet, the energizing circuit of the magnet 23 is completed through the contact of the needle 19 with the mercury column 88 in the tube 18 and may be traced as follows: Battery 93, conductor 94, connecting block 80, which is of metal or other conducting material, mercury column 88, contact needle 19, cap 79, conductor 95, contact 28, conductor 96, magnet 23, and back through conductor 97 to battery 93.

To operate the device, I provide a sprocket chain 30 driven by the sprocket wheel 109 through the shaft 110 and gearing 31 which may be arranged in any well known manner for varying the speed of the shaft 110 in relation to a driving gear 210, Fig. 1. From the driving sprocket 109, the chain passes over the idler sprockets 111, 112 and 113 and thence over operating sprockets 114 and 115 back to the driving sprocket. The sprocket 114 is furnished to operate the cleaning belt 27 through the gears 116 arranged to be thrown into mesh upon downward movement of the arm 117, which is effected by engagement therewith of the lug 118 on the carriage 20, the arm 117 and gear shift lever 150 being arranged as shown to form a bell-crank lever pivoted at 151, so that downward movement of the arm 117 will result in a movement of the gear shift lever 150 to the right thus bringing the gears 116 into mesh. The sprocket 115 is used for the purpose of operating certain parts of the testing machine to which the present recording means is applied and will not be described herein as it forms no part of the present invention. One link on the sprocket chain 30 is provided with an extension 32 arranged to engage the outer and inner operating lugs 119 and 120 respectively, of the carriage 20, successively, the lower lug 119 being positioned in the same vertical plane as the down-going side of the vertical loop in the chain while the inner or upper lug 120 is similarly positioned in relation to the up-going side of the chain, as clearly shown in Fig. 4.

In operation the sprocket chain 30 travels in the direction indicated by the arrow at the top of Fig. 3 and carries the timing extension or lug 32 around with it which upon passing around the sprocket 114 and upwardly to the sprocket 115, engages the lifting lug 120 on the carriage 20, sliding the carriage upwardly on the guide rods 22.

The carriage 20 continuing its upward movement carries the armature 21 and with it the lug 29 upwardly and into engagement with the lever arm of the contact 28, moving the contact 28 into closed position as indicated in Fig. 2 and when the carriage reaches a position to bring the plummet 24 into the proper position to engage the inking device 90, a contact rod 19 makes contact with the contact spring 38 which closes the energizing circuit of the magnet 23. The magnet 23 upon energization attracts the armature 21 bringing the plummet 24 into engagement with the inking pad 25, thus inking the plummet. The several pads 25 on the inking device 90 carry different colored inks and the device 90 is made to turn so as to present different pads to the plummet for the purpose of characterizing different records or groups of records. In the present embodiment this inking device 90 is shown connected to the operating parts of the testing machine which will not be here described as it forms the subject matter of United States Patent No. 1,320,584, granted to me November 4, 1919, of which the present application is a division. For the present it may be considered as remaining stationary and supplying the same colored ink for all the records or set by hand at different intervals to characterize the records made between such intervals. Immediately upon the attraction of the armature 21, it engages the insulating stud 190 which swings the contact 28 into open position thus causing the magnet 23 to become de-energized and release the armature 21 which moves the plummet 24 out of engagement with the inking pad 25.

The timing lug now passes over the operating sprockets 115, 109, etc., of the testing machine and back to the left over the sprocket 113. As the timing lug 32 continues its travel downward from the sprocket 113 it engages with the carriage lowering lug 119. As the recorder carriage 20 moves down the lug 29 on the armature 21 again engages the lever arm of the contact 28 moving the contact 28 into the closed position as indicated in Fig. 2, and as the carriage continues its downward movement the contact needle 19 is brought into contact with the mercury in the tube 18 whereupon the circuit of the magnet 23 is completed in a manner previously described, and the armature 21 momentarily attracted to tap the plummet 24 on the record sheet 26 making a mark at a point on the sheet corresponding to the percentage of carbon dioxid in the sample tested, the mark being of a color indicating the source from which the sample was taken. The carriage continuing to the lower limit of its travel causes the plummet 24 to come in contact with the cleaning belt 27, and the belt clutch 116 to be closed by engagement of the lug 118 with the clutch arm 117 which sets the belt 27 in motion to clean the remaining ink from the plummet.

While I have herein described and illustrated a particular embodiment of my invention, for the purpose of disclosure, it is to be understood that I do not limit myself to such embodiment but contemplate all such modifications and variants thereof as may fairly fall within the scope of the appended claims.

Having thus described my invention what I claim and desire to secure by Letters Patent is:—

1. Pressure recording means comprising an inverted syphon of mercury having one arm open to atmosphere and the other connected to receive the pressure to be recorded, a moving chronologically marked record tablet, a marker arranged to be moved over the record tablet normally out of engagement therewith, electrically operated means operable to cause said marker to momentarily engage the record, electrical contacting means arranged to move in a given ratio to the movement of said marker into contact with the upper surface of the mercury in one of the syphon arms, and an energizing circuit for said electrically operated means controlled through the contact between the mercury and said contacting means.

2. Pressure recording means comprising a mercury column movable in response to pressure variations, a vertical record tablet, a rigid carriage mounted to slide in a vertical plane, a stationary electromagnet, an armature pivoted vertically on said carriage in operative relation to said magnet in all positions of the carriage, a marking element carried by said armature arranged to move across said record tablet normally out of contact therewith in the movement of said carriage and to be momentarily brought into contact with the record tablet upon energization of the magnet, a contact directly and rigidly connected with said carriage and arranged to move into and out of engagement with said mercury column in the movement of the carriage, and an energizing circuit for said electromagnet controlled through the engagement of said contact with the mercury column.

3. Pressure recording means comprising a mercury column variable in response to variations in the pressure to be measured, a horizontally driven record tablet, an inking device and a marking plummet cleaning device mounted one above and one below said record tablet, a vertically movable carriage, a marking plummet pivotally mounted on said carriage to move vertically across said tablet and into operative relation with said inking and cleaning devices, with the vertical movement of said carriage and to swing horizontally about its pivot into and out of engagement with said inking device, said tablet and said cleaning device, a contact rod rigidly mounted on said carriage to move into and out of contact with said mercury column, in the movement of the carriage, electro-magnetic means operable upon energization to cause said plummet to momentarily engage the record tablet or said inking device according to its vertical position, an energizing circuit for said electromagnetic means controlled through said contact and mercury column, a switching device operable to complete said energizing circuit upon the movement of the plummet into operative relation with said inking device, said inking device being arranged to supply different kinds of ink to the plummet at will.

4. Recording means comprising an inking device, a record tablet and a cleaning device with a printing element movable across the tablet from a position in operative relation with the inking device into engagement with said cleaning device, means operable upon movement of the printing element into operative relation with the inking device to move the printing element into contact with the inking device, meter controlled means operable to move said printing element into contact with the record tablet at a point in its travel thereacross commensurate in extent with the indication of the meter.

5. Recording means comprising a record tablet, a printing element therefor, inking means for said printing element, a meter, means for moving said printing means from said inking device across the record tablet, electromagnetic means operable upon energization to move said printing element into contact with said inking device or said tablet according to its position, an energizing circuit for said electromagnetic means, means operable to close the energizing circuit of said electromagnetic means upon movement of the printing element into operative relation with the inking device, means controlled by said meter for closing said energizing circuit, and means operable upon movement of the printing element toward the tablet or inking device to open said energizing circuit immediately after momentary contact of said printing element with either tablet or inking device.

In testimony whereof I affix my signature.

LAURENCE A. STENGER.